United States Patent
Sakai et al.

(10) Patent No.: US 8,098,350 B2
(45) Date of Patent: Jan. 17, 2012

(54) DISPLAY AND VIEW ANGLE CONTROL ELEMENT EMPLOYED THEREIN

(75) Inventors: Takehiko Sakai, Osaka (JP); Dai Chiba, Osaka (JP); Katsuhiko Morishita, Osaka (JP); Yoshiharu Kataoka, Osaka (JP); Chikanori Tsukamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 174 days.

(21) Appl. No.: 12/668,871

(22) PCT Filed: Jun. 19, 2008

(86) PCT No.: PCT/JP2008/061199
§ 371 (c)(1),
(2), (4) Date: Jan. 12, 2010

(87) PCT Pub. No.: WO2009/011199
PCT Pub. Date: Jan. 22, 2009

(65) Prior Publication Data
US 2010/0188617 A1 Jul. 29, 2010

(30) Foreign Application Priority Data
Jul. 19, 2007 (JP) ................................. 2007-188533

(51) Int. Cl.
*G02F 1/1347* (2006.01)
(52) U.S. Cl. ................ 349/75; 349/56; 349/74; 349/84; 349/86; 349/87
(58) Field of Classification Search .................... 349/56, 349/74, 75, 84, 86, 87
See application file for complete search history.

(56) References Cited

U.S. PATENT DOCUMENTS

| 7,551,239 | B2 * | 6/2009 | Fukushima et al. | 349/16 |
| 7,956,940 | B2 * | 6/2011 | Sakai et al. | 349/12 |
| 2005/0243265 | A1 | 11/2005 | Winlow et al. | |
| 2007/0115230 | A1 * | 5/2007 | Tajiri et al. | 345/87 |

FOREIGN PATENT DOCUMENTS

| JP | 10-268251 | 10/1998 |
| JP | 3322197 | 6/2002 |
| JP | 2006-106439 | 4/2006 |
| JP | 2007-52260 | 3/2007 |
| JP | 2007-155817 | 6/2007 |

OTHER PUBLICATIONS

International Search Report for PCT/JP2008/061199, mailed Jul. 15, 2008.

* cited by examiner

*Primary Examiner* — Jennifer Doan
(74) *Attorney, Agent, or Firm* — Nixon & Vanderhye, P.C.

(57) ABSTRACT

There are provided a display that can block light so that a display on an image display device is invisible from a wide range of view angles in an oblique direction, and a view angle control element employed therein. In a narrow view angle state, a view angle control liquid crystal panel (2) prevents light in a predetermined wavelength region that has been incident at a polar angle of $\phi_H$ or more from being transmitted through a polarizing plate (22) by using a phase difference imparted by a liquid crystal cell (21). In the narrow view angle state, a view angle control liquid crystal panel (3) prevents light that has been incident at a polar angle of $\phi_L$ or more, among light that has been transmitted through the polarizing plate (22), from being transmitted through a polarizing plate (32) by using a phase difference imparted by a liquid crystal cell (31). Consequently, light forming a polar angle of $\phi_L$ or more is blocked as a whole, which allows the narrow view angle state to cover a wide range.

12 Claims, 5 Drawing Sheets

DISPLAY AND VIEW ANGLE CONTROL ELEMENT EMPLOYED THEREIN

This application is the U.S. national phase of International Application No. PCT/JP2008/061199, filed 19 Jun. 2008, which designated the U.S. and claims priority to Japan Application No. 2007-188533 filed 19 Jul. 2007, the entire contents of each of which are hereby incorporated by reference.

TECHNICAL FIELD

The present invention relates to a view angle control element that can switch a view angle of a display between a wide view angle and a narrow view angle, and a display using the same.

BACKGROUND ART

In general, displays are required to have as wide a view angle as possible so that a sharp image is visible from any view angle. In particular, liquid crystal displays, which recently have become widespread, have been under various technical developments so as to achieve a wider view angle, since liquid crystal itself has view angle dependence. However, depending on the use environment, a narrow view angle is sometimes preferable so as to allow only a user to view a display. In particular, notebook personal computers, personal digital assistants (PDAs), mobile phones, and the like are highly likely to be used in a place, such as a train and an airplane, where an indefinite number of people can be present. In such a use environment, in view of confidentiality, privacy protection, and the like, it is desirable for the display to have a narrow view angle so as not to allow nearby strangers to look in a display. Thus, there is a growing demand for one display to have a view angle that is to be switched between a wide view angle and a narrow view angle depending on the use environment. Such a demand is an issue facing not only liquid crystal displays but also any displays.

In response to the above-described demand, a technique has been proposed in which a phase difference control device is provided along with a display device for displaying an image, and a voltage to be applied to the phase difference control device is controlled, thereby changing view angle characteristics (for example, Japanese Patent No. 3322197). In Japanese Patent No. 3322197, examples of a liquid crystal mode to be used in the phase difference control liquid crystal display device include chiral nematic liquid crystal, homogeneous liquid crystal, randomly aligned nematic liquid crystal, and the like.

Also, a configuration has been disclosed conventionally in which a display liquid crystal panel and a view angle control liquid crystal panel provided thereon are sandwiched between two polarizing plates, and a voltage to be applied to the view angle control liquid crystal panel is adjusted, thereby controlling a view angle (for example, JP 10-268251 A and JP 2005-316470 A). In JP 10-268251 A, a liquid crystal mode of the view angle control liquid crystal panel is a twist nematic type. JP 2005-316470 A discloses a configuration in which the view angle control liquid crystal panel is sandwiched between two polarizing plates having transmission axes parallel to each other.

DISCLOSURE OF INVENTION

Problem to be Solved by the Invention

The conventional view angle control liquid crystal panels as described above use a phase difference of the liquid crystal panel to control a view angle. However, since the liquid crystal panel has refraction aeolotropy that varies depending on the view angle, a phase difference (retardation) caused in the liquid crystal panel depends on the view angle. Thus, it is difficult to block light in a wide view angle range simultaneously with one view angle control liquid crystal panel.

In view of the above-described problem, an object of the present invention is to provide a display that can block light so that a display on an image display device is invisible from a wide range of view angles in an oblique direction, and a view angle control element employed therein.

Means for Solving Problem

In order to achieve the above-described object, a display according to the present invention includes: an image display device that displays an image; and a view angle control element that is laminated on the image display device to control a view angle of the image display device. The view angle control element includes: a first shielding layer that includes an optical element having birefringence and at least one polarizing plate including an outgoing-side polarizing plate provided on an outgoing side of the optical element, and prevents light in a predetermined wavelength region that has been incident at a first angle or more from being transmitted through the outgoing-side polarizing plate by using a phase difference imparted by the optical element; and at least one auxiliary shielding layer that includes an optical element having birefringence and at least one polarizing plate including an outgoing-side polarizing plate provided on an outgoing side of the optical element, and prevents light in the predetermined wavelength region that has been incident at a second angle or more, which is smaller than the first angle, from being transmitted through the outgoing-side polarizing plate by using a phase difference imparted by the optical element. The first shielding layer and the auxiliary shielding layer block light in the predetermined wavelength region that has been incident on the view angle control element at the second angle or more.

Further, in order to achieve the above-described object, a view angle control element according to the present invention is laminated on an image display device that displays an image, to control a view angle of the image display device. The view angle control element includes: a first shielding layer that includes an optical element having birefringence and at least one polarizing plate including an outgoing-side polarizing plate provided on an outgoing side of the optical element, and prevents light in a predetermined wavelength region that has been incident at a first angle or more from being transmitted through the outgoing-side polarizing plate by using a phase difference imparted by the optical element; and at least one auxiliary shielding layer that includes an optical element having birefringence and at least one polarizing plate including an outgoing-side polarizing plate provided on an outgoing side of the optical element, and prevents light in the predetermined wavelength region that has been incident at a second angle or more, which is smaller than the first angle, from being transmitted through the outgoing-side polarizing plate by using a phase difference imparted by the optical element. The first shielding layer and the auxiliary shielding layer block light in the predetermined wavelength region that has been incident on the view angle control element at the second angle or more.

Effects of the Invention

According to the present invention, it is possible to provide a display that can block light so that a display on an image display device is invisible from a wide range of view angles in an oblique direction, and a view angle control element employed therein.

DESCRIPTION OF THE INVENTION

Figure 1:
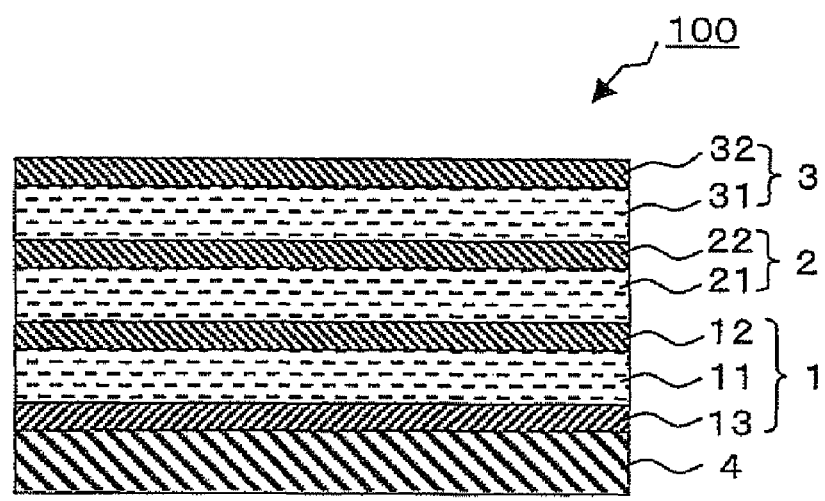
FIG. 1 is a cross-sectional view showing a schematic configuration of a display according to a first embodiment of the present invention.

A display according to an embodiment of the present invention includes: an image display device that displays an image; and a view angle control element that is laminated on the image display device to control a view angle of the image display device. The view angle control element includes: a first shielding layer that includes an optical element having birefringence and at least one polarizing plate including an outgoing-side polarizing plate provided on an outgoing side of the optical element, and prevents light in a predetermined wavelength region that has been incident at a first angle or more from being transmitted through the outgoing-side polarizing plate by using a phase difference imparted by the optical element; an optical element having birefringence; and at least one polarizing plate including an outgoing-side polarizing plate provided on an outgoing side of the optical element. The display includes at least one auxiliary shielding layer that prevents light in the predetermined wavelength region that has been incident at a second angle or more, which is smaller than the first angle, from being transmitted through the outgoing-side polarizing plate by using a phase difference imparted by the optical element. The first shielding layer and the auxiliary shielding layer block light in the predetermined wavelength region that has been incident on the view angle control element at the second angle or more.

With the above-described configuration, the combination of the first shielding layer and the auxiliary shielding layer blocks light in the predetermined wavelength region that has been incident on the view angle control element at the second angle or more. Therefore, the display can block light so that a display on the image display device is invisible from a wide range of view angles when seen from an oblique direction.

In the above-described display, for example, the optical element of the first shielding layer is a liquid crystal panel, and the optical element of the auxiliary shielding layer is a liquid crystal panel. Alternatively, the optical element of the first shielding layer may be a retardation plate, and the optical element of the auxiliary shielding layer may be a liquid crystal panel. Alternatively, the optical element of the first shielding layer can be a retardation plate, and the optical element of the auxiliary shielding layer can be a retardation plate.

In the above-described display, it is preferable that the optical element of the first shielding layer is sandwiched between the polarizing plates whose polarization absorption axes are substantially parallel to each other, and the following expression is satisfied:

$$n\lambda/2 - \lambda/4 < R < n\lambda/2 + \lambda/4$$

where R represents a retardation of each of the optical elements of the first shielding layer and the auxiliary shielding layer, λ represents a wavelength of light to be blocked by each of the layers, and n is an integer of 0 or more.

Alternatively, in the above-described display, it is also possible that the optical element of the first shielding layer is sandwiched between the polarizing plates whose polarization absorption axes are substantially orthogonal to each other, and the following expression is satisfied:

$$n\lambda - \lambda/4 < R < n\lambda + \lambda/4$$

where R represents a retardation of each of the optical elements of the first shielding layer and the auxiliary shielding layer, λ represents a wavelength of light to be blocked by each of the layers, and n is an integer of 0 or more.

In the display according to an embodiment of the present invention, it is possible that the image display device is a transmission type liquid crystal display device, and the display further includes a backlight. In this case, the view angle control element may be provided between the backlight and the transmission type liquid crystal display device, or alternatively, the view angle control element may be provided on the front of the transmission type liquid crystal display device.

Further, in the display according to an embodiment of the present invention, it is also possible that the image display device is a reflection type liquid crystal display device or a semi-transmission type liquid crystal display device, and the view angle control element is provided on the front of the transmission type liquid crystal display device. Alternatively, it is also possible that the image display device is a self-emission type display device, and the view angle control element is provided on the front of the self-emission type display device.

Further, a view angle control element according to an embodiment of the present invention is laminated on an image display device that displays an image, to control a view angle of the image display device. The view angle control element includes: a first shielding layer that includes an optical element having birefringence and at least one polarizing plate including an outgoing-side polarizing plate provided on an outgoing side of the optical element, and prevents light in a predetermined wavelength region that has been incident at a first angle or more from being transmitted through the outgoing-side polarizing plate by using a phase difference imparted by the optical element; an optical element having birefringence; and at least one polarizing plate including an outgoing-side polarizing plate provided on an outgoing side of the optical element. The view angle control element includes at least one auxiliary shielding layer that prevents light in the predetermined wavelength region that has been incident at a second angle or more, which is smaller than the first angle, from being transmitted through the outgoing-side polarizing plate by using a phase difference imparted by the optical element. The first shielding layer and the auxiliary shielding layer block light in the predetermined wavelength region that has been incident on the view angle control element at the second angle or more.

Hereinafter, more specific embodiments of the present invention will be described with reference to the drawings. It should be noted that each figure, which will be referred to in the following, shows only main members required for describing the present invention among constituent members of the embodiments of the present invention, in a simplified manner for convenience of explanation. Thus, a display according to the present invention can include any constituent members not shown in each figure referred to in the present specification. Further, the size and size ratio of the members in each figure do not exactly reflect those of actual constituent members.

First Embodiment

FIG. 1 is a cross-sectional view showing a schematic configuration of a liquid crystal display 100 according to a first embodiment of the present invention. As shown in FIG. 1, the liquid crystal display 100 includes two view angle control liquid crystal panels 2 and 3 on the front of a display liquid crystal panel 1 (image display device) for displaying an image. In other words, the liquid crystal display 100 includes a total of three liquid crystal panels. The display liquid crystal panel 1 in the present embodiment is of a transmission type, and a backlight 4 using a three-wavelength light source is provided on the back of the display liquid crystal panel 1. In the liquid crystal display 100 shown in FIG. 1, the view angle control liquid crystal panel 2 and the view angle control liquid crystal panel 3 are provided on the front (observer side) of the display liquid crystal panel 1.

In the liquid crystal display 100, by switching liquid crystal in each of the view angle control liquid crystal panel 2 and the view angle control liquid crystal panel 3, a display state can be switched between a state where an image on the display liquid crystal panel 1 is visible from a wide view angle and a state where the image is visible from a narrow view angle. The narrow view angle state is used preferably particularly when the image on the display liquid crystal panel 1 is to be made invisible to strangers, while the wide view angle state is used preferably in normal use or when the image on the display liquid crystal panel 1 is to be made visible to a plurality of people at the same time.

The display liquid crystal panel 1 includes a liquid crystal cell 11 in which liquid crystal is sandwiched between a pair of translucent substrates, and polarizing plates 12 and 13 provided on the front and back of the liquid crystal cell 11. The liquid crystal cell 11 may have any liquid crystal mode and cell structure. Also, the display liquid crystal panel 1 may have any drive mode. Namely, any liquid crystal panel that can display characters, images, or moving images can be used as the display liquid crystal panel 1. Thus, a detailed structure of the display liquid crystal panel 1 is not shown in FIG. 1, and the description thereof will be omitted. Further, the display liquid crystal panel 1 may be a panel capable of color display or a panel specifically designed for monochrome display. Further, there is no particular limitation on a configuration of the backlight 4, and any well-known backlight can be used.

Thus, a detailed structure of the backlight 4 is not shown in the figure, and the description thereof will be omitted.

The view angle control liquid crystal panel 2 includes a liquid crystal cell 21 and a polarizing plate 22 laminated on a principal surface of the liquid crystal cell 21 on a side opposite to the display liquid crystal panel 1. In the narrow view angle state, the liquid crystal cell 21, in combination with the polarizing plate 12 of the display liquid crystal panel 1 and the polarizing plate 22, has a characteristic of preventing light having a wavelength $\lambda$ in a predetermined range ($\lambda_1 \leq \lambda \leq \lambda_2$) from being transmitted in a direction forming a polar angle $\phi$ of $\phi_H$ or more in a at least a part of an azimuth angle range of 0° to 360°. It should be noted that the polar angle refers to an angle formed by the traveling direction of transmitted light with respect to a normal line of the liquid crystal display 100. The liquid crystal cell 21 can be a liquid crystal cell of any liquid crystal mode, as long as the above-described characteristic can be achieved in the narrow view angle state. The value of $\phi_H$, which may be set arbitrarily, is 60°, for example, in the present embodiment. In the wide view angle state, the view angle control liquid crystal panel 2 preferably has a characteristic of allowing the display on the display liquid crystal panel 1 to be visible from a polar angle more than $\phi_H$, and most preferably from a polar angle as close to 90° as possible.

The view angle control liquid crystal panel 3 includes a liquid crystal cell 31 and a polarizing plate 32 laminated on a principal surface of the liquid crystal cell 31 on a side opposite to the display liquid crystal panel 1. In the narrow view angle state, the liquid crystal cell 31, in combination with the polarizing plate 22 of the view angle control liquid crystal panel 2 and the polarizing plate 32, has a characteristic of preventing light having a wavelength $\lambda$ in the predetermined range ($\lambda_1 \leq \lambda \leq \lambda_2$) from being transmitted in a direction forming a polar angle $\phi$ of $\phi_L$ or more in the above-described part of the azimuth angle range of 0° to 360°. The liquid crystal cell 31 can be a liquid crystal cell of any liquid crystal mode, as long as the above-described characteristic can be achieved in the narrow view angle state. The value of $\phi_L$, which may be set arbitrarily, is 30°, for example, in the present embodiment. In the wide view angle state, the view angle control liquid crystal panel 3 preferably has a characteristic of allowing the display on the display liquid crystal panel 1 to be visible from a polar angle more than $\phi_L$ or $\phi_H$, and most preferably from a polar angle as close to 90° as possible.

The values of $\lambda_1$ and $\lambda_2$, which may be set arbitrarily depending on the view angle characteristics required for the liquid crystal display 100, preferably are set so that at least one of peak wavelengths of three primary colors of RGB is included in the range of $\lambda_1 \leq \lambda \leq \lambda_2$. In particular, a wavelength region of green (G), to which human vision has high sensitivity, preferably is included in the above-described predetermined range ($\lambda_1 \leq \lambda \leq \lambda_2$). The following are specific examples shown as mere examples. For example, where $\lambda_1=450$ nm and $\lambda_2=650$ nm, the narrow view angle state can be achieved mainly with respect to light in a green wavelength region. Further, where $\lambda_1=350$ nm and $\lambda_2=550$ nm, the narrow view angle state can be achieved mainly with respect to light in a blue wavelength region. Further, where $\lambda_1=550$ nm and $\lambda_2=750$ nm, the narrow view angle state can be achieved mainly with respect to light in a red wavelength region.

In the liquid crystal display 100, the polarizing plates 12, 22, and 32 are in a so-called parallel Nicol arrangement so that their polarization absorption axes coincide with one another. The polarizing plate 13 of the display liquid crystal panel 1 may be in a parallel Nicol arrangement or a cross Nicol arrangement with respect to the polarizing plate 12 depending on the liquid crystal mode of the liquid crystal cell 11 and the characteristics of other optical members (for example, various retardation plates) that can be included in the display liquid crystal panel 1.

Figure 2:
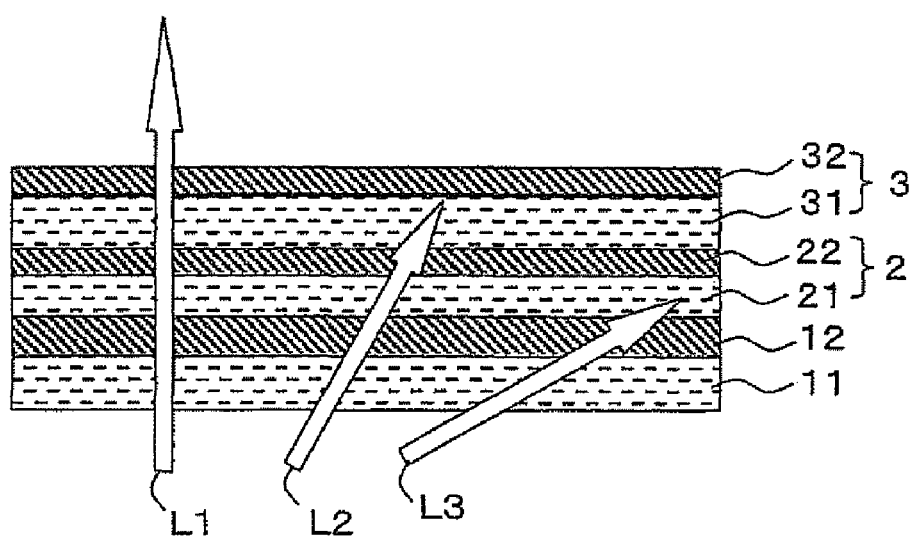
FIG. 2 is a schematic view showing optical characteristics of the display according to the first embodiment when a view angle control liquid crystal panel assumes a narrow view angle state.

FIG. 2 is a schematic view showing optical characteristics of the liquid crystal display 100 when both the view angle control liquid crystal panel 2 and the view angle control liquid crystal panel 3 assume the narrow view angle state. It should be noted that each light L1, L2, and L3 shown schematically in FIG. 2 has a wavelength $\lambda$ in the predetermined range ($\lambda_1 \leq \lambda \leq \lambda_2$). In FIG. 2, the polarizing plate 13 and the backlight 4 are not shown. As shown in FIG. 2, when both the view angle control liquid crystal panel 2 and the view angle control liquid crystal panel 3 assume the narrow view angle state, light L1 that travels in a front direction (polar angle $\phi=0°$) is transmitted through the view angle control liquid crystal panel 2 and the view angle control liquid crystal panel 3, so that it is visible to an observer. On the other hand, light L2 that travels in a direction forming a polar angle $\phi$ in a range of $\phi_L \leq \phi \leq \phi_H$ is transmitted through the view angle control liquid crystal panel 2 but is blocked by the view angle control liquid crystal panel 3. Further, light L3 that travels in a direction forming a polar angle $\phi$ more than $\phi_H$ is blocked by the view angle control liquid crystal panel 2. In this manner, when the view angle control liquid crystal panel 2 and the view angle control liquid crystal panel 3 assume the narrow view angle state, light in the predetermined wavelength range ($\lambda_1 \leq \lambda \leq \lambda_2$) that travels in an oblique direction forming a polar angle $\phi$ of $\phi_L$ or more is blocked, so that it is invisible to the observer. Consequently, when the view angle control liquid crystal panel 2 and the view angle control liquid crystal panel 3 assume the narrow view angle state, it is possible to prevent a look from an oblique direction forming a polar angle $\phi$ of $\phi_L$ or more.

In order to achieve the above-described optical characteristics, it is necessary to satisfy the following conditions (1) to (4) when the view angle control liquid crystal panel 2 and the view angle control liquid crystal panel 3 assume the narrow view angle state. It should be noted here that the polarizing plates 12, 22, and 32 are in a so-called parallel Nicol arrangement so that their polarization absorption axes coincide with one another, as described above.

(1) The behavior of liquid crystal molecules in the liquid crystal cell 21 is controlled so that a retardation value $R_{21\phi0}$ of the liquid crystal cell 21 with respect to the front direction (polar angle $\phi=0°$) satisfies the following conditional expression (f1), where each n is an integer of 0 or more, with respect to a wavelength component in the predetermined range ($\lambda_1 \leq \lambda \leq \lambda_2$). It should be noted that n may be the same value or different from each other in the following conditional expression (f1) and subsequent conditional expressions.

$$n\lambda - \lambda/4 < R_{21\phi0} < n\lambda + \lambda/4 \quad (f1)$$

If the above condition (f1) is satisfied, an oscillation surface of linearly polarized light that has been transmitted through the polarizing plate 12 to be incident on the liquid crystal cell 21 is rotated about 180° when the light passes through the liquid crystal cell 21, thereby allowing the light to be transmitted through the polarizing plate 22.

(2) The behavior of liquid crystal molecules in the liquid crystal cell 31 is controlled so that a retardation value $R_{31\phi0}$ of the liquid crystal cell 31 with respect to the front direction (polar angle $\phi=0°$) satisfies the following conditional expression (f2), where each n is an integer of 0 or more, with respect to a wavelength component in the predetermined range ($\lambda_1 \leq \lambda \leq \lambda_2$).

$$n\lambda - \lambda/4 < R_{31\phi0} < n\lambda + \lambda/4 \quad (f2)$$

If the above condition (f2) is satisfied, an oscillation surface of linearly polarized light that has been transmitted through the polarizing plate 22 to be incident on the liquid crystal cell 31 is rotated about 180° when the light passes through the liquid crystal cell 31, thereby allowing the light to be transmitted through the polarizing plate 32.

(3) The behavior of the liquid crystal molecules in the liquid crystal cell 21 is controlled so that a retardation value $R_{21\phi H}$ of the liquid crystal cell 21 with respect to a direction forming a polar angle $\phi \geq \phi_H$ satisfies the following conditional expression (f3) with respect to a wavelength component in the predetermined range ($\lambda_1 \leq \lambda \leq \lambda_2$).

$$n\lambda/2 - \lambda/4 < R_{21\phi H} < n\lambda/2 + \lambda/4 \quad (f3)$$

If the above condition (f3) is satisfied, an oscillation surface of linearly polarized light that has been transmitted through the polarizing plate 12 to be incident on the liquid crystal cell 21 at a polar angle $\phi \geq \phi_H$ is rotated about 90° when the light passes through the liquid crystal cell 21, thereby not allowing the light to be transmitted through the polarizing plate 22.

(4) The behavior of the liquid crystal molecules in the liquid crystal cell 31 is controlled so that a retardation value $R_{31\phi L}$ of the liquid crystal cell 31 with respect to a direction forming a polar angle $\phi \geq \phi_L$ satisfies the following conditional expression (f4) with respect to a wavelength component in the predetermined range ($\lambda_1 \leq \lambda \leq \lambda_2$).

$$n\lambda/2 - \lambda/4 < R_{31\phi L} < n\lambda/2 + \lambda/4 \quad (f4)$$

If the above condition (f4) is satisfied, an oscillation surface of linearly polarized light that has been transmitted through the polarizing plate 22 to be incident on the liquid crystal cell 31 at a polar angle $\phi \geq \phi_L$ is rotated about 90° when the light passes through the liquid crystal cell 31, thereby not allowing the light to be transmitted through the polarizing plate 32. In this manner, light in the range of $\phi_L \leq \phi \leq \phi_H$ that was not blocked by the view angle control liquid crystal panel 2 can be blocked by the view angle control liquid crystal panel 3.

In the liquid crystal display 100 shown in FIG. 1, the polarizing plate 22 may be in a cross Nicol arrangement with respect to the polarizing plate 12. In such a case, the term $n\lambda$ in the above expression (f1) may be substituted with $n\lambda/2$, and the term $n\lambda/2$ in the expression (f3) may be substituted with $n\lambda$.

Further, the polarizing plate 32 may be in a cross Nicol arrangement with respect to the polarizing plate 22. In such a case, the term $n\lambda$ in the above expression (f2) may be substituted with $n\lambda/2$, and the term $n\lambda/2$ in the expression (f4) may be substituted with $n\lambda$.

In order to achieve more excellent narrow view angle characteristics, the term $\lambda/4$ in the above expressions (f3) and (f4) preferably is set to $\lambda/8$, for example, or a small value closer to zero.

As described above, in the liquid crystal display 100 according to the present embodiment, when the view angle control liquid crystal panel 2 and the view angle control liquid crystal panel 3 assume the narrow view angle state, among light that has a wavelength component in the predetermined range ($\lambda_1 \leq \lambda \leq \lambda_2$) and is not blocked by the view angle control liquid crystal panel 2 (i.e., light that is transmitted in a direction forming a polar angle less than $\phi_H$), light that forms a polar angle of $\phi_L$ or more can be blocked reliably by the third view angle control liquid crystal panel 3. Thus, light emitted in an oblique direction forming a polar angle of $\phi_L$ or more can be blocked entirely. Consequently, it is possible to achieve the narrow view angle state where the display on the display liquid crystal panel 1 is made completely invisible when seen from a view angle in an oblique direction.

When the view angle control liquid crystal panel 2 assumes the narrow view angle state, while the view angle control liquid crystal panel 3 assumes the wide view angle state, the view angle control liquid crystal panel 3 does not block light in a range of $\phi_L \leq \phi$ so as to be transmitted, and only light in a range of $\phi \geq \phi_H$ is blocked by the view angle control liquid crystal panel 2. Accordingly, the display on the display liquid crystal panel 1 can be made visible also in the range of $\phi_L \leq \phi \leq \phi_H$. Namely, in the liquid crystal display 100 according to the present embodiment, when both the view angle control liquid crystal panel 2 and the view angle control liquid crystal panel 3 assume the narrow view angle state, the narrow view angle state can cover a wide range so that light in a range of $\phi \geq \phi_L$ is blocked. On the other hand, when the view angle control liquid crystal panel 2 assumes the narrow view angle state, while the view angle control liquid crystal panel 3 assumes the wide view angle state, the narrow view angle state covers a narrow range so that only light in the range of $\phi \geq \phi_H$ is blocked.

Although in the above-described specific example, the light source of the backlight 4 is a three-wavelength light source, it may be a four-wavelength light source. In addition, any light sources other than a three-wavelength light source and a four-wavelength light source are also available. However, in the case where the backlight uses a light source that has a brightness peak at a predetermined wavelength, such as a three-wavelength light source and a four-wavelength light source, the wavelength of the brightness peak preferably is included in the above-described predetermined range ($\lambda_1 \leq \lambda \leq \lambda_2$). In particular, a wavelength region of green (G), to which human vision has high sensitivity, preferably is included in the above-described predetermined range ($\lambda_1 \leq \lambda \leq \lambda_2$).

Figure 3A:
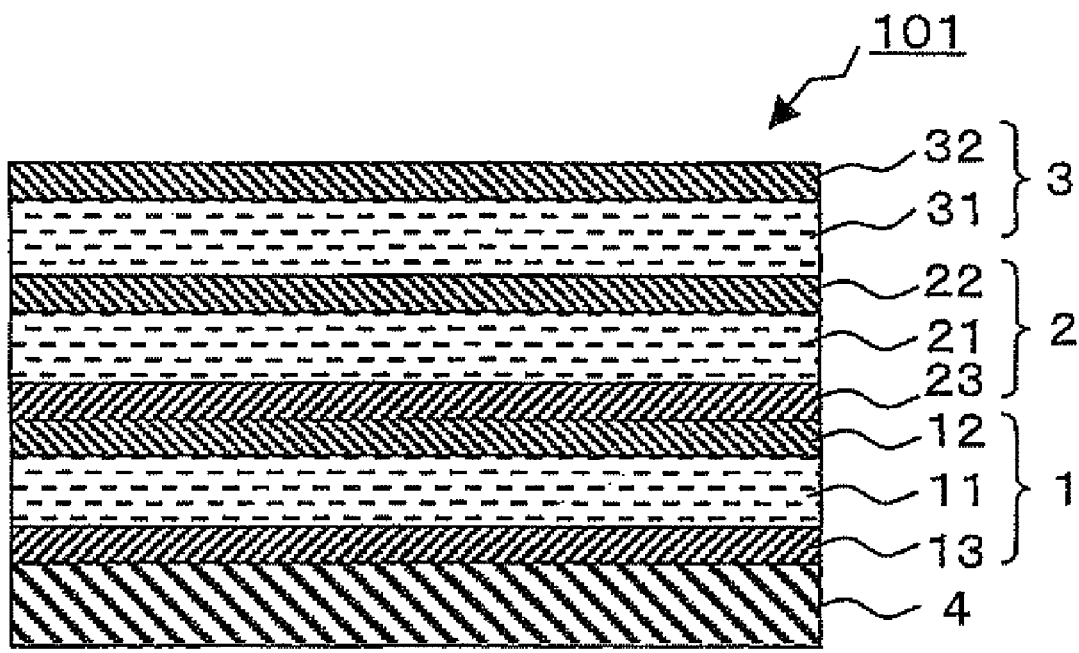
FIGS. 3A and 3B are cross-sectional views, each showing a schematic configuration of a modification of the display according to the first embodiment.
Figure 3B:
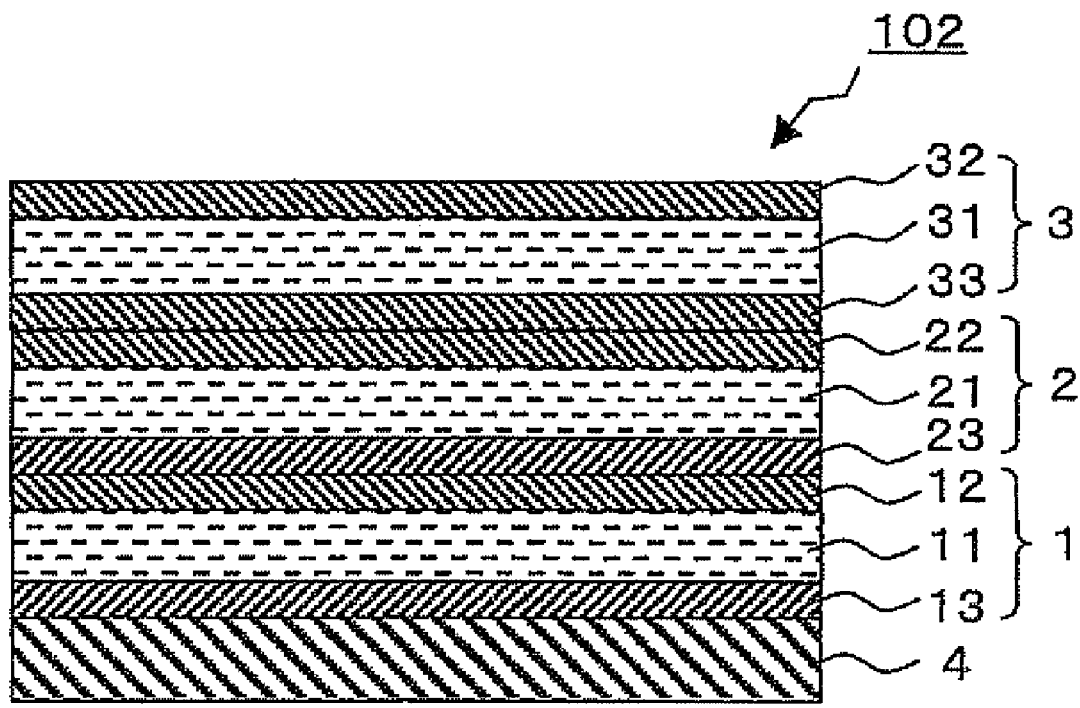

In the present embodiment, as shown in FIG. 1, the polarizing plate 12 serves as both an outgoing-side polarizing plate of the display liquid crystal panel 1 and an incident-side polarizing plate of the view angle control liquid crystal panel 2. Further, in the configuration in FIG. 1, the polarizing plate 22 serves as both an outgoing-side polarizing plate of the view angle control liquid crystal panel 2 and an incident-side polarizing plate of the view angle control liquid crystal panel 3. However, as shown in FIG. 3A, a liquid crystal display 101 that further includes a polarizing plate 23 as an incident-side polarizing plate of the view angle control liquid crystal panel 2 on the polarizing plate 12 also serves as an embodiment of the present invention. In addition, as shown in FIG. 3B, a liquid crystal display 102 that further includes a polarizing plate 33 as an incident-side polarizing plate of the view angle control liquid crystal panel 3 on the polarizing plate 22 also serves as an embodiment of the present invention. However, the liquid crystal display 100 shown in FIG. 1 has the advantage over the liquid crystal displays 101 and 102 shown in FIGS. 3A and 3B because it requires a smaller number of polarizing plates.

Figure 4:
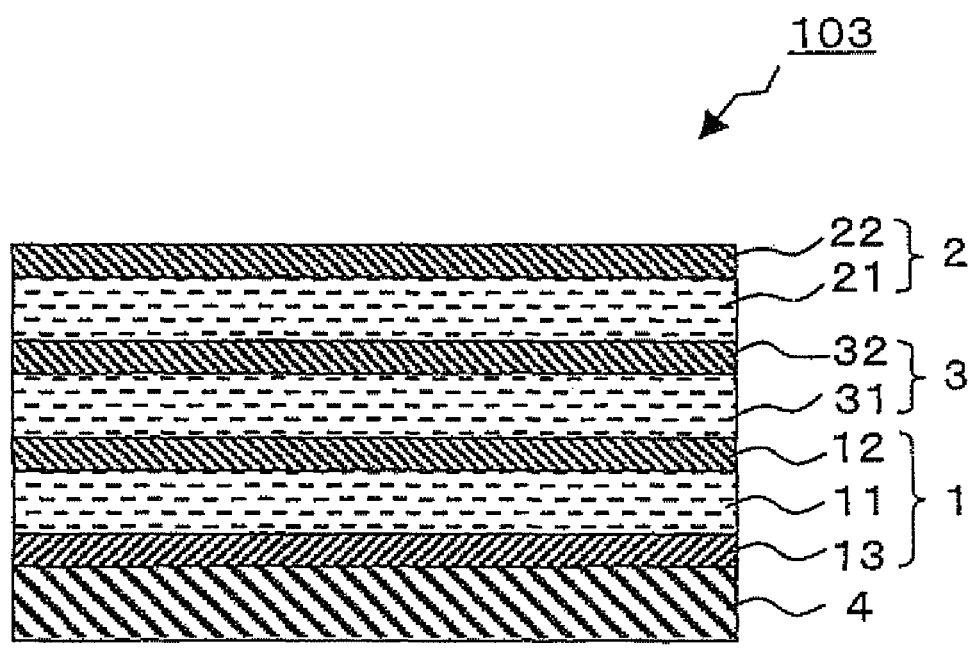
FIG. 4 is a cross-sectional view showing a schematic configuration of a modification of the display according to the first embodiment.

Further, in the present embodiment, the view angle control liquid crystal panel 2 is provided close to the display liquid crystal panel 1, and the view angle control liquid crystal panel 3 is provided on the front (observer side) of the view angle control liquid crystal panel 2. However, for example, as shown in FIG. 4, a liquid crystal display 103 in which the view angle control liquid crystal panel 2 and the view angle control liquid crystal panel 3 are laminated in a reverse order to that shown in FIG. 1 also serves as an embodiment of the present invention.

Further, in the present embodiment, the two view angle control liquid crystal panels are provided. However, three or more view angle control liquid crystal panels may be provided so as further to divide the polar angle range of light to be blocked. For example, three view angle control liquid crystal panels may be provided, so that a first view angle control liquid crystal panel blocks light in a polar angle range of $\phi \geq 30°$, a second view angle control liquid crystal panel blocks light in a polar angle range of $\phi \geq 50°$, and a third view angle control liquid crystal panel blocks light in a polar angle range of $\phi \geq 70°$.

Further, for example, in the above-described embodiment, light in the predetermined wavelength region $\lambda_1 \leq \lambda \leq \lambda_2$ that forms a predetermined polar angle or more is blocked by using at least a pair of two view angle control liquid crystal panels. However, a plurality of pairs of the view angle control liquid crystal panels may be provided to cover different wavelength ranges, thereby achieving the narrow view angle state with respect to light in a wider wavelength region as a whole. For example, it is possible to provide the view angle control liquid crystal panels 2 and 3, having an optical characteristic of blocking light in a blue wavelength region that forms a polar angle in a range of $\phi \geq \phi_H$ and $\phi \geq \phi_L$, respectively, the view angle control liquid crystal panels 2 and 3, having an optical characteristic of blocking light in a green wavelength region that forms a polar angle in a range of $\phi \geq \phi_H$ and $\phi \geq \phi_L$, respectively, and the view angle control liquid crystal panels 2 and 3, having an optical characteristic of blocking light in a red wavelength region that forms a polar angle in a range of $\phi \geq \phi_H$ and $\phi \geq \phi_L$, respectively. Alternatively, it is also possible to provide the view angle control liquid crystal panels 2 and 3, having an optical characteristic of blocking light in a blue wavelength region that forms a polar angle in a range of $\phi \geq \phi_H$ and $\phi \geq \phi_L$, respectively, and the view angle control liquid crystal panels 2 and 3, having an optical characteristic of blocking light in a green wavelength region that forms a polar angle in a range of $\phi \geq \phi_H$ and $\phi \geq \phi_L$, respectively. Alternatively, it is also possible to provide the view angle control liquid crystal panels 2 and 3, having an optical characteristic of blocking light in a green wavelength region that forms a polar angle in a range of $\phi \geq \phi_H$ and $\phi \geq \phi_L$, respectively, and the view angle control liquid crystal panels 2 and 3, having an optical characteristic of blocking light in a red wavelength region that forms a polar angle in a range of $\phi \geq \phi_H$ and $\phi \geq \phi_L$, respectively.

Further, in the present embodiment, the combination of the view angle control liquid crystal panel 2 and the view angle control liquid crystal panel 3 blocks a view at a polar angle of $\phi_L$ or more in at least a part of the azimuth angle range of 0° to 360°. In other words, the narrow view angle state cannot be achieved necessarily in the entire azimuth angle range of 0° to 360° because the refraction aeolotropy of the liquid crystal sometimes depends on the azimuth angle depending on the liquid crystal mode of each of the liquid crystal panels 21 and 31. Thus, in order to achieve the narrow view angle state in a larger part of the azimuth angle range, two or more pairs of the view angle control liquid crystal panel 2 and the view angle control liquid crystal panel 3 may be laminated in varying directions, for example.

Second Embodiment

A second embodiment according to the present invention will be described below. The components having the same functions as those described in the first embodiment will be denoted with the same reference numerals, and the detailed description thereof will be omitted.

Figure 5:
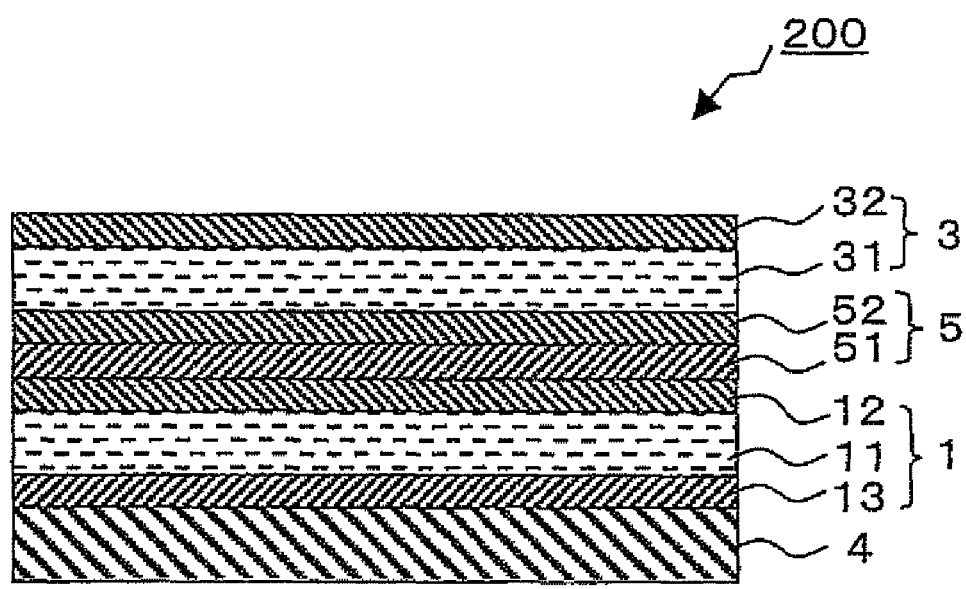
FIG. 5 is a cross-sectional view showing a schematic configuration of a display according to a second embodiment of the present invention.

FIG. 5 is a cross-sectional view showing a schematic configuration of a liquid crystal display 200 according to the second embodiment. As shown in FIG. 5, the liquid crystal display 200 includes a view angle control film 5 instead of the view angle control liquid crystal panel 2 on the front (observer side) of the display liquid crystal panel 1. The view angle control film 5 is composed of a retardation plate 51 and a polarizing plate 52. The view angle control liquid crystal panel 3 is provided on the front of the view angle control film 5.

The retardation plate 51 of the view angle control film 5 has the same optical characteristics as those of the liquid crystal cell 21 in the first embodiment in the narrow view angle state. As the retardation plate 51, a negative C plate (nx=ny>nz) can be used, for example. More specifically, in order to prevent light in the predetermined wavelength range ($\lambda_1 \leq \lambda \leq \lambda_2$) that has been transmitted through the polarizing plate 12 in a direction forming a polar angle of $\phi_H$ or more from being transmitted through the polarizing plate 52, a negative C plate whose retardation value with respect to light to be transmitted in this direction is about $\lambda/2$ may be used as the retardation plate 51.

In the liquid crystal display 200, the polarizing plates 12, 52, and 32 are in a so-called parallel Nicol arrangement so that their polarization absorption axes coincide with one another. The polarizing plate 13 may be in a parallel Nicol arrangement or a cross Nicol arrangement with respect to the polarizing plate 12 depending on the liquid crystal mode of the liquid crystal cell 11 and the characteristics of other optical members (for example, various retardation plates) that can be included in the display liquid crystal panel 1.

Figure 6:
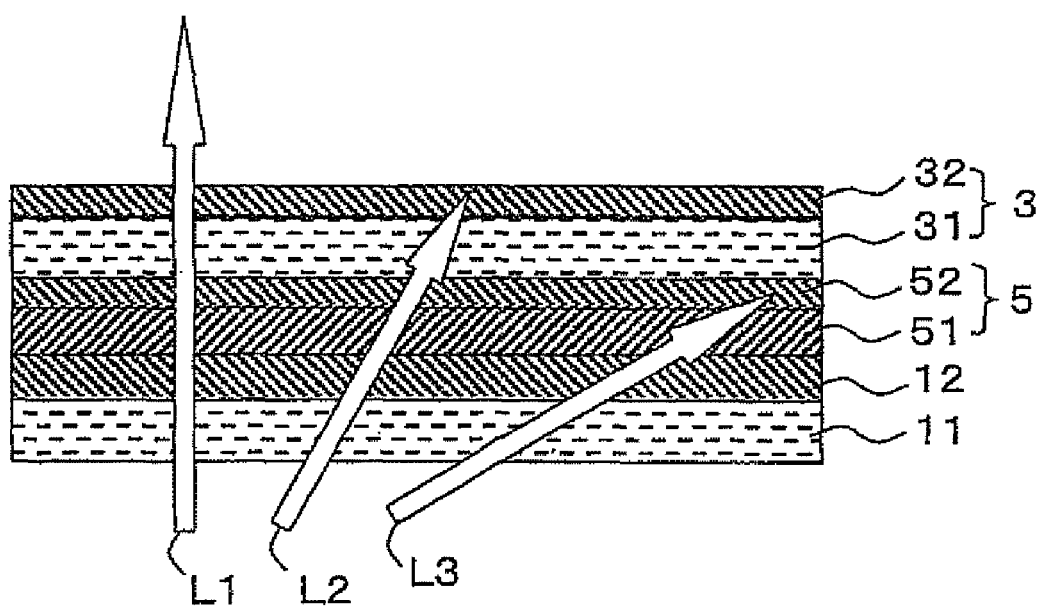
FIG. 6 is a schematic view showing optical characteristics of the display according to the second embodiment when a view angle control liquid crystal panel assumes a narrow view angle state.

FIG. 6 is a schematic view showing optical characteristics of the liquid crystal display 200 when the view angle control liquid crystal panel 3 assumes the narrow view angle state. In FIG. 6, the polarizing plate 13 and the backlight 4 are not shown. As shown in FIG. 6, when the view angle control liquid crystal panel 3 assumes the narrow view angle state in the liquid crystal display 200, as in the liquid crystal display 100 (see FIG. 2) in the first embodiment, light L1 that travels in the front direction (polar angle $\phi=0°$) is transmitted through the view angle control film 5 and the view angle control liquid crystal panel 3, so that it is visible to an observer. On the other hand, light L2 that travels in a direction forming a polar angle $\phi$ in the range of $\phi_L \leq \phi \leq \phi_H$ is transmitted through the view angle control film 5 but is blocked by the view angle control liquid crystal panel 3. Further, light L3 that travels in a direction forming a polar angle $\phi$ more than $\phi_H$ is blocked by the view angle control film 5. In this manner, when the view angle control liquid crystal panel 3 assumes the narrow view angle state, light in the predetermined wavelength range ($\lambda_1 \leq \lambda \leq \lambda_2$) that travels in an oblique direction forming a polar angle $\phi$ of $\phi_L$ or more is blocked, so that it is invisible to the observer. Consequently, when the view angle control liquid crystal panel 3 assumes the narrow view angle state, it is possible to prevent a look from an oblique direction forming a polar angle $\phi$ of $\phi_L$ or more.

In order to achieve the above-described optical characteristics, it is necessary to satisfy the following conditions (1) to (4). The following conditions (2) and (4) regarding the retardation of the liquid crystal cell 31 are exactly the same as those in the first embodiment. It should be noted here that the polarizing plates 12, 52, and 32 are in a so-called parallel Nicol arrangement so that their polarization absorption axes coincide with one another, as described above.

(1) A retardation value $R_{51\phi0}$ of the retardation plate 51 with respect to the front direction (polar angle $\phi=0°$) satisfies the following conditional expression (f5), where each n is an integer of 0 or more, with respect to a wavelength component in the predetermined range ($\lambda_1 \leq \lambda \leq \lambda_2$). It should be noted that n may be the same value or different from each other in the following conditional expression (f5) and subsequent conditional expressions.

$$n\lambda - \lambda/4 < R_{51\phi0} < n\lambda + \lambda/4 \quad \text{(f5)}$$

If the above condition (f5) is satisfied, an oscillation surface of linearly polarized light that has been transmitted through the polarizing plate 12 to be incident on the retardation plate 51 is rotated about 180° when the light passes through the retardation plate 51, thereby allowing the light to be transmitted through the polarizing plate 52.

(2) The behavior of the liquid crystal molecules in the liquid crystal cell 31 is controlled so that the retardation value $R_{31\phi0}$ of the liquid crystal cell 31 with respect to the front direction (polar angle $\phi=0°$) satisfies the following conditional expression (f2), where each n is an integer of 0 or more, with respect to a wavelength component in the predetermined range ($\lambda_1 \leq \lambda \leq \lambda_2$).

$$n\lambda - \lambda/4 < R_{31\phi0} \leq n\lambda + \lambda/4 \quad \text{(f2)}$$

If the above condition (f2) is satisfied, an oscillation surface of linearly polarized light that has been transmitted through the polarizing plate 52 to be incident on the liquid crystal cell 31 is rotated about 180° when the light passes through the liquid crystal cell 31, thereby allowing the light to be transmitted through the polarizing plate 32.

(3) A retardation value $R_{21\phi H}$ of the retardation plate 51 with respect to a direction forming a polar angle $\phi \geq \phi_H$ satisfies the following conditional expression (f6) with respect to a wavelength component in the predetermined range ($\lambda_1 \leq \lambda \leq \lambda_2$).

$$n\lambda/2 - \lambda/4 < R_{51\phi H} < n\lambda/2 + \lambda/4 \quad \text{(f6)}$$

If the above condition (f6) is satisfied, an oscillation surface of linearly polarized light that has been transmitted through the polarizing plate 12 to be incident on the retardation plate 51 at a polar angle $\phi \geq \phi_H$ is rotated about 90° when the light passes through the retardation plate 51, thereby not allowing the light to be transmitted through the polarizing plate 52.

(4) The behavior of the liquid crystal molecules in the liquid crystal cell 31 is controlled so that the retardation value $R_{31\phi L}$ of the liquid crystal cell 31 with respect to a direction forming a polar angle $\phi \geq \phi_L$ satisfies the following conditional expression (f4) with respect to a wavelength component in the predetermined range ($\lambda_1 \leq \lambda \leq \lambda_2$).

$$n\lambda/2 - \lambda/4 < R_{31\phi L} < n\lambda/2 + \lambda/4 \quad \text{(f4)}$$

If the above condition (f4) is satisfied, an oscillation surface of linearly polarized light that has been transmitted through the polarizing plate 52 to be incident on the liquid crystal cell 31 at a polar angle $\phi \geq \phi_L$ is rotated about 90° when the light passes through the liquid crystal cell 31, thereby not allowing the light to be transmitted through the polarizing plate 32. In this manner, light in the range of $\phi_L \leq \phi \leq \phi_H$ that was not blocked by the view angle control film 5 can be blocked by the view angle control liquid crystal panel 3.

In the liquid crystal display 200 shown in FIG. 5, the polarizing plate 52 may be in a cross Nicol arrangement with respect to the polarizing plate 12. In such a case, the term $n\lambda$ in the above expression (f5) may be substituted with $n\lambda/2$, and the term $n\lambda/2$ in the expression (f6) may be substituted with $n\lambda$.

Further, the polarizing plate 32 may be in a cross Nicol arrangement with respect to the polarizing plate 52. In such a case, the term nλ in the above expression (f2) may be substituted with nλ/2, and the term nλ/2 in the expression (f4) may be substituted with nλ.

In order to achieve more excellent narrow view angle characteristics, the term λ/4 in the above expressions (f6) and (f4) preferably is set to λ/8, for example, or a small value closer to zero.

As described above, in the liquid crystal display 200 according to the present embodiment, light that has a wavelength component in the predetermined range ($\lambda_1 \leq \lambda \leq \lambda_2$) and travels in a direction forming a polar angle of $\phi_L$ or more can be blocked reliably. Consequently, it is possible to achieve the narrow view angle state where a display on the display liquid crystal panel 1 is made completely invisible when seen from a view angle in an oblique direction forming a polar angle of $\phi_L$ or more.

In the liquid crystal display 200 according to the present embodiment, the view angle control film 5 always blocks light in the range of $\phi \geq \phi_H$. Thus, when the view angle control liquid crystal panel 3 assumes the wide view angle state, the view angle control liquid crystal panel 3 does not block light in the range of $\phi_L \leq \phi$ so as to be transmitted, and only light in the range of $\phi \geq \phi_H$ is blocked by the view angle control film 5. Accordingly, the display on the display liquid crystal panel 1 can be made visible also in the range of $\phi_L \leq \phi \leq \phi_H$. Namely, in the liquid crystal display 200 according to the present embodiment, when the view angle control liquid crystal panel 3 assumes the narrow view angle state, the narrow view angle state can cover a wide range so that light in the range of $\phi \geq \phi_L$ is blocked. On the other hand, when the view angle control liquid crystal panel 3 assumes the wide view angle state, the narrow view angle state covers a narrow range so that only light in the range of $\phi \geq \phi_H$ is blocked.

Also in the present embodiment, the backlight 4 can have a four wavelength light source or any other light source instead of a three-wavelength light source as in the first embodiment.

In the present embodiment, the polarizing plate 12 serves as both an outgoing-side polarizing plate of the display liquid crystal panel 1 and an incident-side polarizing plate of the view angle control film 5. However, as in the liquid crystal displays 101 and 102 shown in FIGS. 3A and 3B in the first embodiment, an additional polarizing plate may be provided on the polarizing plate 12 or on the polarizing plate 52.

Further, also in the present embodiment, the view angle control film 5 and the view angle control liquid crystal panel 3 may be laminated in a reverse order.

Further, in the present embodiment, the one view angle control liquid crystal panel and the one view angle control film are provided. However, a total of three or more view angle control liquid crystal panels or view angle control films may be provided so as further to divide the polar angle range of light to be blocked.

Further, in the present embodiment, the combination of the view angle control film 5 and the view angle control liquid crystal panel 3 blocks a view at a polar angle of $\phi_L$ or more in at least a part of the azimuth angle range of 0° to 360°. In other words, the narrow view angle state cannot be achieved necessarily in the entire azimuth angle range of 0° to 360° because the refraction aeolotropy of the liquid crystal sometimes depends on the azimuth angle depending on the liquid crystal mode of the liquid crystal panel 31. Thus, in order to achieve the narrow view angle state in a larger part of the azimuth angle range, two or more pairs of the view angle control film 5 and the view angle control liquid crystal panel 3 may be laminated in varying directions, for example.

Third Embodiment

A third embodiment according to the present invention will be described below.

The components having the same functions as those described in the above-described embodiments will be denoted with the same reference numerals, and the detailed description thereof will be omitted.

Figure 7:
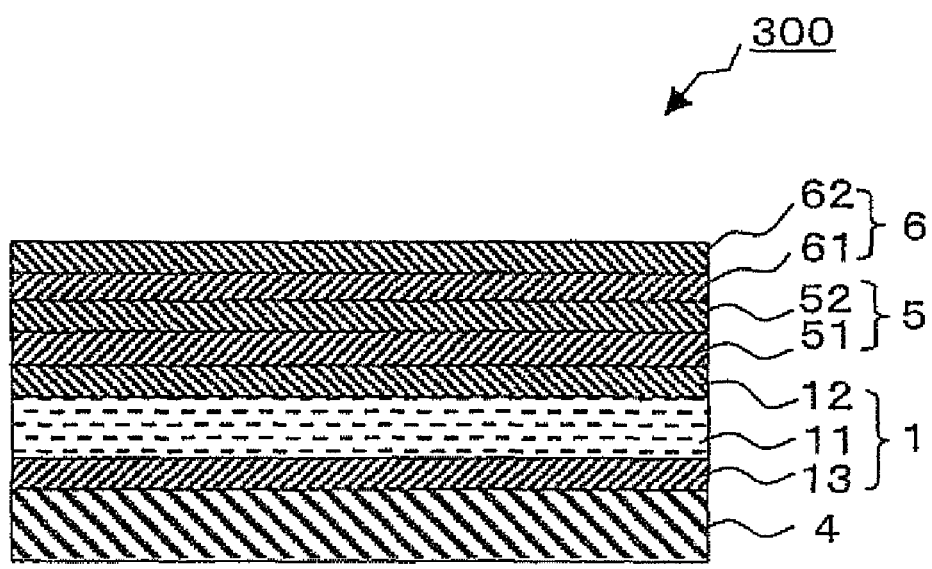
FIG. 7 is a cross-sectional view showing a schematic configuration of a display according to a third embodiment of the present invention.

FIG. 7 is a cross-sectional view showing a schematic configuration of a liquid crystal display 300 according to the third embodiment. As shown in FIG. 7, the liquid crystal display 300 includes the view angle control film 5 as described in the second embodiment on the front (observer side) of the display liquid crystal panel 1. The liquid crystal display 300 further includes a view angle control film 6 on the front of the view angle control film 5. The view angle control film 6 is composed of a retardation plate 61 and a polarizing plate 62.

The retardation plate 61 of the view angle control film 6 has the same optical characteristics as those of the liquid crystal cell 31 in the first embodiment in the narrow view angle state. As the retardation plate 61, a negative C plate (nx=ny>nz) can be used, for example. More specifically, in order to prevent light in the predetermined wavelength range ($\lambda_1 \leq \lambda \leq \lambda_2$) that has been transmitted through the polarizing plate 52 in a direction forming a polar angle of $\phi_L$ or more from being transmitted through the polarizing plate 62, a negative C plate whose retardation value with respect to light to be transmitted in this direction is about λ/2 may be used as the retardation plate 61.

In the liquid crystal display 300, the polarizing plates 12, 52, and 62 are in a so-called parallel Nicol arrangement so that their polarization absorption axes coincide with one another. The polarizing plate 13 may be in a parallel Nicol arrangement or a cross Nicol arrangement with respect to the polarizing plate 12 depending on the liquid crystal mode of the liquid crystal cell 11 and the characteristics of other optical members (for example, various retardation plates) that can be included in the display liquid crystal panel 1.

Figure 8:
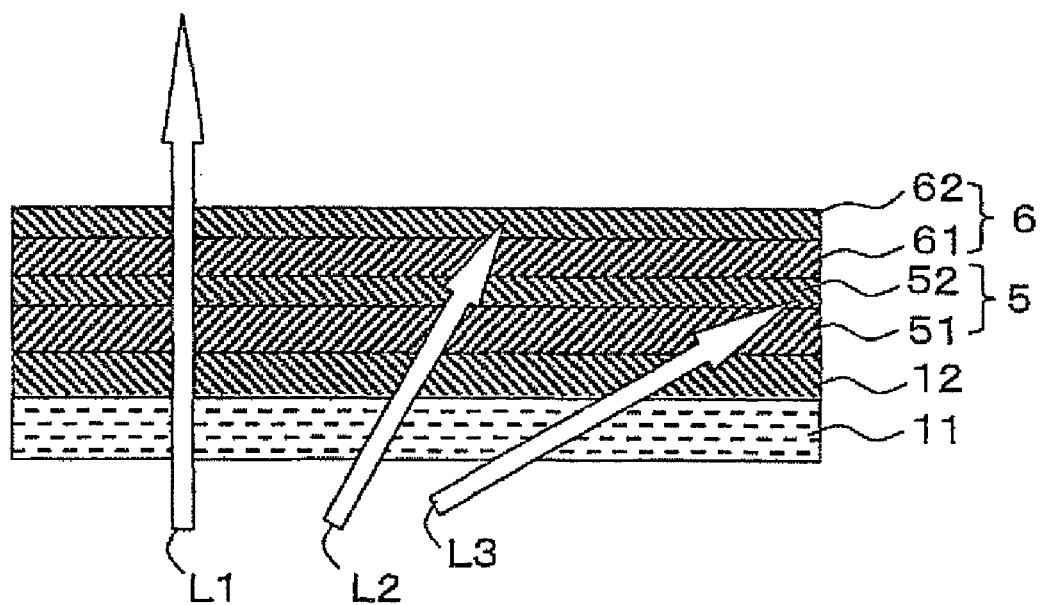
FIG. 8 is a schematic view showing optical characteristics of the display according to the third embodiment.

FIG. 8 is a schematic view showing optical characteristics of the liquid crystal display 300. In FIG. 8, the polarizing plate 13 and the backlight 4 are not shown. As shown in FIG. 8, in the liquid crystal display 300, as in the liquid crystal display 100 (see FIG. 2) in the first embodiment, light L1 that travels in the front direction (polar angle $\phi=0°$) is transmitted through the view angle control film 5 and the view angle control film 6, so that it is visible to an observer. On the other hand, light L2 that travels in a direction forming a polar angle $\phi$ in the range of $\phi_L \leq \phi \leq \phi_H$ is transmitted through the view angle control film 5 but is blocked by the view angle control film 6. Further, light L3 that travels in a direction forming a polar angle $\phi$ more than $\phi_H$ is blocked by the view angle control film 5. In this manner, light in the predetermined wavelength range ($\lambda_1 \leq \lambda \leq \lambda_2$) that travels in an oblique direction forming a polar angle $\phi$ of $\phi_L$ or more is blocked, so that it is invisible to the observer. Consequently, it is possible to prevent a look from an oblique direction forming a polar angle $\phi$ of $\phi_L$ or more.

In order to achieve the above-described optical characteristics, it is necessary to satisfy the following conditions (1) to (4). The following conditions (1) and (3) regarding the retardation of the retardation plate 51 are exactly the same as those in the second embodiment. It should be noted here that the polarizing plates 12, 52, and 62 are in a so-called parallel Nicol arrangement so that their polarization absorption axes coincide with one another, as described above.

(1) The retardation value $R_{51\phi0}$ of the retardation plate 51 with respect to the front direction (polar angle $\phi=0°$) satisfies the following conditional expression (f5), where each n is an integer of 0 or more, with respect to a wavelength component in the predetermined range ($\lambda_1 \leq \lambda \leq \lambda_2$). It should be noted that n may be the same value or different from each other in the following conditional expression (f5) and subsequent conditional expressions.

$$n\lambda - \lambda/4 < R_{51\phi 0} < n\lambda + \lambda/4 \tag{f5}$$

If the above condition (f5) is satisfied, an oscillation surface of linearly polarized light that has been transmitted through the polarizing plate 12 to be incident on the retardation plate 51 is rotated about 180° when the light passes through the retardation plate 51, thereby allowing the light to be transmitted through the polarizing plate 52.

(2) A retardation value $R_{61\phi 0}$ of the retardation plate 61 with respect to the front direction (polar angle $\phi=0°$) satisfies the following conditional expression (f7), where each n is an integer of 0 or more, with respect to a wavelength component in the predetermined range ($\lambda_1 \leq \lambda \leq \lambda_2$).

$$n\lambda - \lambda/4 < R_{61\phi 0} < n\lambda + \lambda/4 \tag{f7}$$

If the above condition (f7) is satisfied, an oscillation surface of linearly polarized light that has been transmitted through the polarizing plate 52 to be incident on the retardation plate 61 is rotated about 180° when the light passes through the retardation plate 61, thereby allowing the light to be transmitted through the polarizing plate 62.

(3) The retardation value $R_{21\phi H}$ of the retardation plate 51 with respect to a direction forming a polar angle $\phi \geq \phi_H$ satisfies the following conditional expression (f6) with respect to a wavelength component in the predetermined range ($\lambda_1 \leq \lambda \leq \lambda_2$).

$$n\lambda/2 - \lambda/4 < R_{51\phi H} < n\lambda/2 + \lambda/4 \tag{f6}$$

If the above condition (f6) is satisfied, an oscillation surface of linearly polarized light that has been transmitted through the polarizing plate 12 to be incident on the retardation plate 51 at a polar angle $\phi \geq \phi_H$ is rotated about 90° when the light passes through the retardation plate 51, thereby not allowing the light to be transmitted through the polarizing plate 52.

(4) A retardation value $R_{61\phi L}$ of the retardation plate 61 with respect to a direction forming a polar angle $\phi \geq \phi_L$ satisfies the following conditional expression (f8) with respect to a wavelength component in the predetermined range ($\lambda_1 \leq \lambda \leq \lambda_2$).

$$n\lambda/2 - \lambda/4 < R_{61\phi L} < n\lambda/2 + \lambda/4 \tag{f8}$$

If the above condition (f8) is satisfied, an oscillation surface of linearly polarized light that has been transmitted through the polarizing plate 52 to be incident on the retardation plate 61 at a polar angle $\phi \geq \phi_L$ is rotated about 90° when the light passes through the retardation plate 61, thereby not allowing the light to be transmitted through the polarizing plate 62. In this manner, light in the range of $\phi_L \leq \phi \leq \phi_H$ that was not blocked by the view angle control film 5 can be blocked by the view angle control film 6.

In the liquid crystal display 300 shown in FIG. 7, the polarizing plate 52 may be in a cross Nicol arrangement with respect to the polarizing plate 12. In such a case, the term $n\lambda$ in the above expression (f5) may be substituted with $n\lambda/2$, and the term $n\lambda/2$ in the expression (f6) may be substituted with $n\lambda$.

Further, the polarizing plate 62 may be in a cross Nicol arrangement with respect to the polarizing plate 52. In such a case, the term $n\lambda$ in the above expression (f7) may be substituted with $n\lambda/2$, and the term $n\lambda/2$ in the expression (f8) may be substituted with $n\lambda$.

In order to achieve more excellent narrow view angle characteristics, the term $\lambda/4$ in the above expressions (f6) and (f8) preferably is set to $\lambda/8$, for example, or a small value closer to zero.

As described above, in the liquid crystal display 300 according to the present embodiment, light that has a wavelength component in the predetermined range ($\lambda_1 \leq \lambda \leq \lambda_2$) and travels in a direction forming a polar angle of $\phi_L$ or more can be blocked reliably. Consequently, it is possible to achieve the narrow view angle state where a display on the display liquid crystal panel 1 is made completely invisible when seen from a view angle in an oblique direction forming a polar angle of $\phi_L$ or more.

Also in the present embodiment, the backlight 4 can have a four-wavelength light source or any other light source instead of a three-wavelength light source as in the first embodiment.

In the present embodiment, the polarizing plate 12 serves as both an outgoing-side polarizing plate of the display liquid crystal panel 1 and an incident-side polarizing plate of the view angle control film 5. However, as in the liquid crystal displays 101 and 102 shown in FIGS. 3A and 3B in the first embodiment, an additional polarizing plate may be provided on the polarizing plate 12 or on the polarizing plate 52.

Further, also in the present embodiment, the view angle control film 5 and the view angle control film 6 may be laminated in a reverse order.

Further, in the present embodiment, the two view angle control films are provided. However, a total of three or more view angle control films may be provided so as further to divide the polar angle range of light to be blocked.

The several embodiments of the present invention have been described above. However, the present invention is not limited only to the above-described specific examples, and various modifications are possible within the scope of the present invention.

Figure 9:
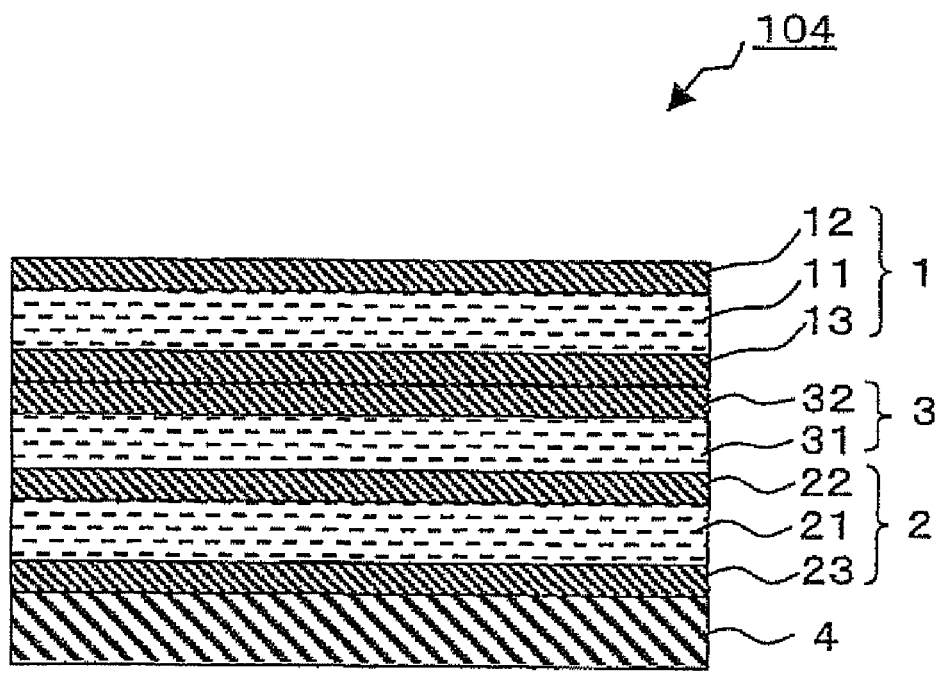
FIG. 9 is a cross-sectional view showing a schematic configuration of a modification of the display according to the first embodiment.

For example, the view angle control elements are provided only on the front of the display liquid crystal panel 1 in the first to third embodiments. However, the view angle control elements may be provided on both the front and back of the display liquid crystal panel 1. For example, FIG. 9 shows a configuration of a liquid crystal display 104 as a further modification of the liquid crystal display 100 according to the first embodiment. As can be seen from FIGS. 1 and 9 in comparison, the display liquid crystal panel 1 and the view angle control liquid crystal panel 2 are laminated in a reverse order between the liquid crystal display 100 and the liquid crystal display 104. More specifically, as shown in FIG. 9, the liquid crystal display 104 has a configuration in which the view angle control liquid crystal panel 2 is provided between the backlight 4 and the display liquid crystal panel 1. In the liquid crystal display 104, the display liquid crystal panel 1 may be a semi-transmission type liquid crystal panel.

Further, the liquid crystal display 104 includes a linear polarizing plate 23 between the backlight 4 and the view angle control liquid crystal panel 2. In the liquid crystal display 100 shown in FIG. 1, the polarizing plate 12 of the display liquid crystal panel 1 functions as a polarizing plate provided on a light incident side of the view angle control liquid crystal panel 2. On the other hand, in the liquid crystal display 104 shown in FIG. 9, the linear polarizing plate has to be provided on a backlight 4 side. However, in the liquid crystal display 104 shown in FIG. 9, the polarizing plate 13 as an incident-side polarizing plate of the display liquid crystal panel 1 can be omitted. Further, in the liquid crystal display 104 shown in FIG. 9, the view angle control film 5 according to the second embodiment or the view angle control film 6 according to the third embodiment may be provided instead of the view angle control liquid crystal panel 2 or the view angle control liquid crystal panel 3.

In the above description, a transmission type liquid crystal panel is given as a specific example of the image display device. However, the image display device is not limited thereto. For example, a reflection type or semi-transmission type liquid crystal panel can be used as the display device. Further, the image display device is not limited to a non-emission type display device such as a liquid crystal display panel, but can be a self-emission type display device such as a CRT (Cathode Ray Tube), a plasma display, an organic EL (Electronic Luminescence) element, an inorganic EL element, a TED (Light Emitting Diode) display, a VFD (Vacuum. Fluorescent Display), a FED (Field Emission Display), and a SED (Surface-conduction Electron-emitter Display).

In the above-described first or second embodiment, when the display assumes the narrow view angle display state, a user may be so informed by a message, an image, or an icon displayed on a screen of the image display device.

Further, in the above-described first or second embodiment, a driving circuit of the view angle control device may be operated depending on an image to be displayed on the image display device, thereby automatically switching between a narrow view angle and a wide view angle. For example, in the case where the display is used to display web pages on the Internet, switching may be performed automatically to the narrow view angle display state if it is found, by referring to software flags that are associated with the respective pages according to the contents on the web pages, that the contents preferably should be made invisible to strangers. Alternatively, switching may be performed to the narrow view angle display state if a browser is started in encryption mode.

Further, if the display is a part of a data input device, or the display is associated with a data input device, to which confidential data is being input or to be input, for example, the display can be adjusted so as to be switched to the narrow view angle display state. For example, when a user inputs some kind of personal identification number, for example, the display may be switched automatically to the narrow view angle state.

In the above-described first or second embodiment, the view angle control device may be formed as a module or a cover that can be detached from the image display device. When such a detachable module is attached to the image display device, it is connected electrically to the image display device, thereby obtaining appropriate power and a control signal.

In the above-described first or second embodiment, it is also preferable to further provide an optical sensor (ambient sensor) for measuring ambient light of the display, so that the display is switched to the narrow view angle display state when a measured value of the optical sensor is below a predetermined threshold value.

It should be noted that the liquid crystal display 300 according to the third embodiment always assumes the narrow view angle state, and cannot be switched between the wide view angle state and the narrow view angle state as the liquid crystal display in the first or second embodiment. However, as compared with the first or second embodiment, the third embodiment has the advantages that the device has a simple configuration, that the entire display can be made thin and lightweight, that high transmittance can be achieved, and the like. Thus, it is preferable to select appropriately among the first to third embodiments depending on the application.

For example, in the case where the display is to be switched between the wide view angle state and the narrow angle state depending on the circumstances, like a display for use in a mobile phone and a mobile PC, the first or second embodiment is applied preferably On the other hand, in the case where it is preferable to always prevent the display from being looked in by strangers obliquely behind a user, like a display panel for an automatic teller machine (ATM), the third embodiment may be applied. Further, the third embodiment may be applied to a vehicle-mounted monitor, so as to prevent a monitor screen from being reflected in a windshield glass and a side glass of a vehicle. The applications of the laminated films, i.e., the view angle control film 5 and the view angle control film 6, described in the third embodiment are not limited to the display. For example, they may be attached to various items such as a windowpane of a vehicle or a building and a screen so as to block view from outside.

Further, the applications of the display and the view angle control element according to the present invention are wide-ranging. For example, they may be applied not only to a display of a notebook personal computer, a personal digital assistant (PDA), a portable game machine, a mobile phone, and the like, but also to a display of various devices such as an ATM, an information terminal to be located in public places, a ticket-vending machine, and a vehicle-mounted display.

While the view angle control element according to the present invention sometimes is implemented in a state where it is included in the display, it may be manufactured and put into circulation as a discrete component of the display.

INDUSTRIAL APPLICABILITY

The present invention is industrially applicable as a display that is applicable to various use environments and applications by switching between a wide view angle and a narrow view angle, and a view angle control element employed therein.

The invention claimed is:

1. A display comprising: an image display device that displays an image; and a view angle control element that is laminated on the image display device to control a view angle of the image display device, wherein the view angle control element comprises:

a first shielding layer that includes an optical element having birefringence and at least one polarizing plate including an outgoing-side polarizing plate provided on an outgoing side of the optical element, and prevents light in a predetermined wavelength region that has been incident at a first angle or more from being transmitted through the outgoing-side polarizing plate by using a phase difference imparted by the optical element; and at least one auxiliary shielding layer that includes an optical element having birefringence and at least one polarizing plate including an outgoing-side polarizing plate provided on an outgoing side of the optical element, and prevents light in the predetermined wavelength region that has been incident at a second angle or more, which is smaller than the first angle, from being transmitted through the outgoing-side polarizing plate by using a phase difference imparted by the optical element, and the first shielding layer and the auxiliary shielding layer block light in the predetermined wavelength region that has been incident on the view angle control element at the second angle or more.

2. The display according to claim 1, wherein the optical element of the first shielding layer is a liquid crystal panel, and the optical element of the auxiliary shielding layer is a liquid crystal panel.

3. The display according to claim 1,
wherein the optical element of the first shielding layer is a retardation plate, and
the optical element of the auxiliary shielding layer is a liquid crystal panel.

4. The display according to claim 1,
wherein the optical element of the first shielding layer is a retardation plate, and
the optical element of the auxiliary shielding layer is a retardation plate.

5. The display according to claim 1,
wherein the optical element of the first shielding layer is sandwiched between the polarizing plates whose polarization absorption axes are substantially parallel to each other, and the following expression is satisfied:

$$n\lambda/2 - \lambda/4 < R < n\lambda/2 + \lambda/4$$

where R represents a retardation of each of the optical elements of the first shielding layer and the auxiliary shielding layer, λ represents a wavelength of light to be blocked by each of the layers, and n is an integer of 0 or more.

6. The display according to claim 1,
wherein the optical element of the first shielding layer is sandwiched between the polarizing plates whose polarization absorption axes are substantially orthogonal to each other, and the following expression is satisfied:

$$n\lambda - \lambda/4 < R < n\lambda + \lambda/4$$

where R represents a retardation of each of the optical elements of the first shielding layer and the auxiliary shielding layer, λ represents a wavelength of light to be blocked by each of the layers, and n is an integer of 0 or more.

7. The display according to claim 1,
wherein the image display device is a transmission type liquid crystal display device, and
the display further comprises a backlight.

8. The display according to claim 7, wherein the view angle control element is provided between the backlight and the transmission type liquid crystal display device.

9. The display according to claim 7, wherein the view angle control element is provided on the front of the transmission type liquid crystal display device.

10. The display according to claim 1,
wherein the image display device is a reflection type liquid crystal display device or a semi-transmission type liquid crystal display device, and
the view angle control element is provided on the front of the transmission type liquid crystal display device.

11. The display according to claim 1,
wherein the image display device is a self-emission type display device, and
the view angle control element is provided on the front of the self-emission type display device.

12. A view angle control element that is laminated on an image display device that displays an image, to control a view angle of the image display device, the view angle control element comprising:
a first shielding layer that includes an optical element having birefringence and at least one polarizing plate including an outgoing-side polarizing plate provided on an outgoing side of the optical element, and prevents light in a predetermined wavelength region that has been incident at a first angle or more from being transmitted through the outgoing-side polarizing plate by using a phase difference imparted by the optical element; and
at least one auxiliary shielding layer that includes an optical element having birefringence and at least one polarizing plate including an outgoing-side polarizing plate provided on an outgoing side of the optical element, and prevents light in the predetermined wavelength region that has been incident at a second angle or more, which is smaller than the first angle, from being transmitted through the outgoing-side polarizing plate by using a phase difference imparted by the optical element, and
the first shielding layer and the auxiliary shielding layer block light in the predetermined wavelength region that has been incident on the view angle control element at the second angle or more.

* * * * *